March 11, 1958 A. G. ERICKSON 2,826,423
COMBINED COASTER AND SKI
Filed April 25, 1955
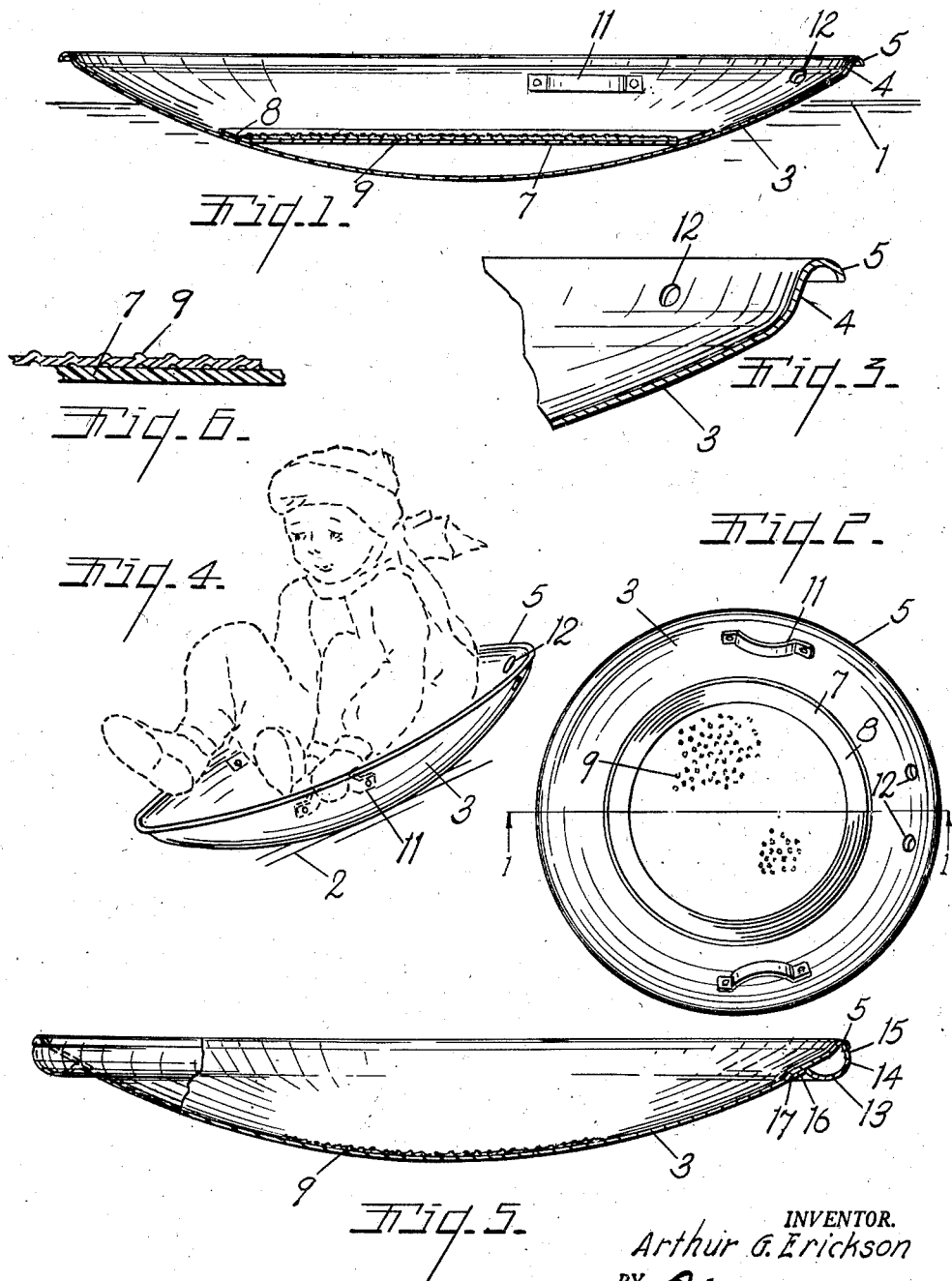
INVENTOR.
Arthur G. Erickson
BY
ATTORNEY.

2,826,423
Patented Mar. 11, 1958

2,826,423
COMBINED COASTER AND SKI

Arthur G. Erickson, Kalamazoo, Mich., assignor to Kalamazoo Sled Company, Kalamazoo, Mich.

Application April 25, 1955, Serial No. 503,748

3 Claims. (Cl. 280—12)

This invention relates to a structure or device adapted for use either as a coaster or as a ski.

The main objects of this invention are:

First, to provide a device or structure adapted for use either as a coaster or ski which is of light weight and at the same time maintains its shape, being substantially resilient when subjected to distorting stresses.

Second, to provide a structure having these advantages which may be quite economically molded of glass fiber reinforced thermo setting resin.

Third, to provide a structure having these advantages which may be very economically produced.

Objects relating to details and economies of the invention will appear from the description to follow. The invention is defined and pointed out in the claims.

A preferred embodiment of the invention is illustrated in the acompanying drawing, in which:

Fig. 1 is a central vertical section of a structure embodying my invention on a line corresponding to line 1—1 of Fig. 2.

Fig. 2 is a plan view.

Fig. 3 is an enlarged fragmentary view in section corresponding to that of Fig. 1.

Fig. 4 is a perspective view illustrating the structure of my invention used as a coaster, the figure of a child being shown in dotted lines.

Fig. 5 is a vertical sectional view corresponding to that of Fig. 1 of a modified form or embodiment of my invention.

Fig. 6 is an enlarged fragmentaory section of the air chamber or bottom panel.

In the accompanying drawing 1 represents water and 2 a coasting surface such as a hill or slide.

The embodiment of my invention illustrated comprises a body member 3 of general concavo-convex shape having an abruptly upturned outwardly inclined peripheral portion 4 terminating in the downturned rim 5, the portion 4 and the rim 5 serving to very effectively brace or reinforce the concavo-convex body. The body member 3 is formed by molding a thermo setting resin reinforced throughout with glass fiber, the product commercially known as "Fiberglas" being found to be very satisfactory and polyester resin being found to be highly desirable resin.

With the use of these materials and the concavo-convex body member shaped as illustrated, it may be of a wall thickness of approximately .0625 and at the same time is very strong and rigid under use stresses, although having sufficient resiliency so that if it is distored, as for example by some one stepping on it or jumping on it, it is not injured and returns to its original concavo-convex shape.

The body member is formed by means of heated molds. The glass fiber is spread on one mold member, preferably the femal member, and the resin is distributed over the glass fiber. The mold members are simultaneously subjected to pressure and heated to a suitable degree to set the resin. With polyester resin, a temperature of approximately 250 degrees is found to be satisfactory.

The proportion of the glass fiber to the thermo setting resin may be considerably varied. As an example they may be used in approximately the proportion of five parts of resin by weight to three parts of glass fiber by weight.

To render the body member buoyant and to provide a flat bottom surface facilitating the use of the device as a water ski, I provide a bottom panel 7 having an upturned peripheral flange 8 which is adhesively bonded or sealed to the inner side of the body member. The surface of this panel is desirably provided with a rough coating 9, or is otherwise roughened to provide a non-slipping surface which is desirable when the device is used as a ski. This roughening is conventionally illustrated in the drawings. The thickness of the coating is exaggerated in Fig. 6. The roughening may be accomplished by applying an adhesive to the panel or to the central portion of the body member when the bottom panel is omitted and particles of cork or the like sprinkled on the adhesive before it sets. This does not in any wise interfere with the use of the device as a coaster, as is illustrated in Fig. 4. Holes 12 are provided for attaching a towing rope.

In the embodiment shown in Fig. 5, an air chamber 13 is provided by securing the annular channel shaped air chamber member 14 on the outer side of the body member, its upper edge 15 being secured within the downturned rim 5. The lower edge of the air chamber member terminates in a flange 16 which is secured to the outer side of the body member desirably in an offset 17 provided therefor.

If the structure is designed to be used only as a coaster, the air chamber may be omitted, but the presence of the air chamber does not interfere with the use of the structure as a coaster. Flexible handles 11 are desirably secured to the inner side of the body member in opposed relation to be grasped when the structure is used as a coaster. This provides secure holds by the occupant without grasping the rim and exposing the hands to possible abrasion.

The structure is light in weight and at the same time while substantially rigid is sufficiently resilient so that even if accidentally distorted it returns to its original shape.

Having thus described my invention, what is claimed as new and is desired to be secured by Letters Patent is:

1. A structure of the class described comprising a body member molded of a thermo setting resin and glass fiber, said body member being of substantially uniform thickness throughout and of generally concavo-convex shape and having an integral upturned outwardly inclined peripheral portion terminating at its peripheral edge in a downturned curved rim, and a disc like air chamber panel of like material disposed centrally within said body member and having an upturned peripheral flange fixedly bonded to inner side of the body member and coacting therewith to provide an air chamber, said panel having a roughened surface.

2. A structure of the class described comprising a body member of thermo setting resin and glass fiber, said body member being of substantially uniform thickness throughout and of generally concavo-convex shape and having an integral upturned outwardly inclined peripheral portion terminating at its peripheral edge in a downturned curved rim, and a disc like air chamber panel disposed centrally within said body member and having an upturned peripheral flange fixedly bonded throughout to the inner side of the body member and coacting therewith to provide an air chamber.

3. A structure of the class described comprising a body member of substantially uniform thickness throughout and of generally concavo-convex shape, and having a downturned rim at its upper edge, an annular inwardly facing channel shaped air chamber member disposed on the outer side of said body member with its upper edge within said rim, the edges of said air chamber member being bonded to said body member and coacting therewith to provide an annular air chamber surrounding said body member.

References Cited in the file of this patent

UNITED STATES PATENTS

| | | | |
|---|---|---|---|
| 325,162 | Delany | Aug. 25, | 1885 |
| 359,741 | Pusey | Mar. 22, | 1887 |
| 981,360 | Barney | Jan. 10, | 1911 |
| 1,559,390 | Waller | Oct. 27, | 1925 |
| 2,464,341 | Ostlund | Mar. 15, | 1949 |
| 2,493,315 | Ruka | Jan. 3, | 1950 |
| 2,695,178 | Rheinfrank | Nov. 23, | 1954 |

FOREIGN PATENTS

| | | | |
|---|---|---|---|
| 14,172 | Austria | July 15, | 1903 |
| 487,708 | Canada | Nov. 4, | 1952 |